Figure 1:
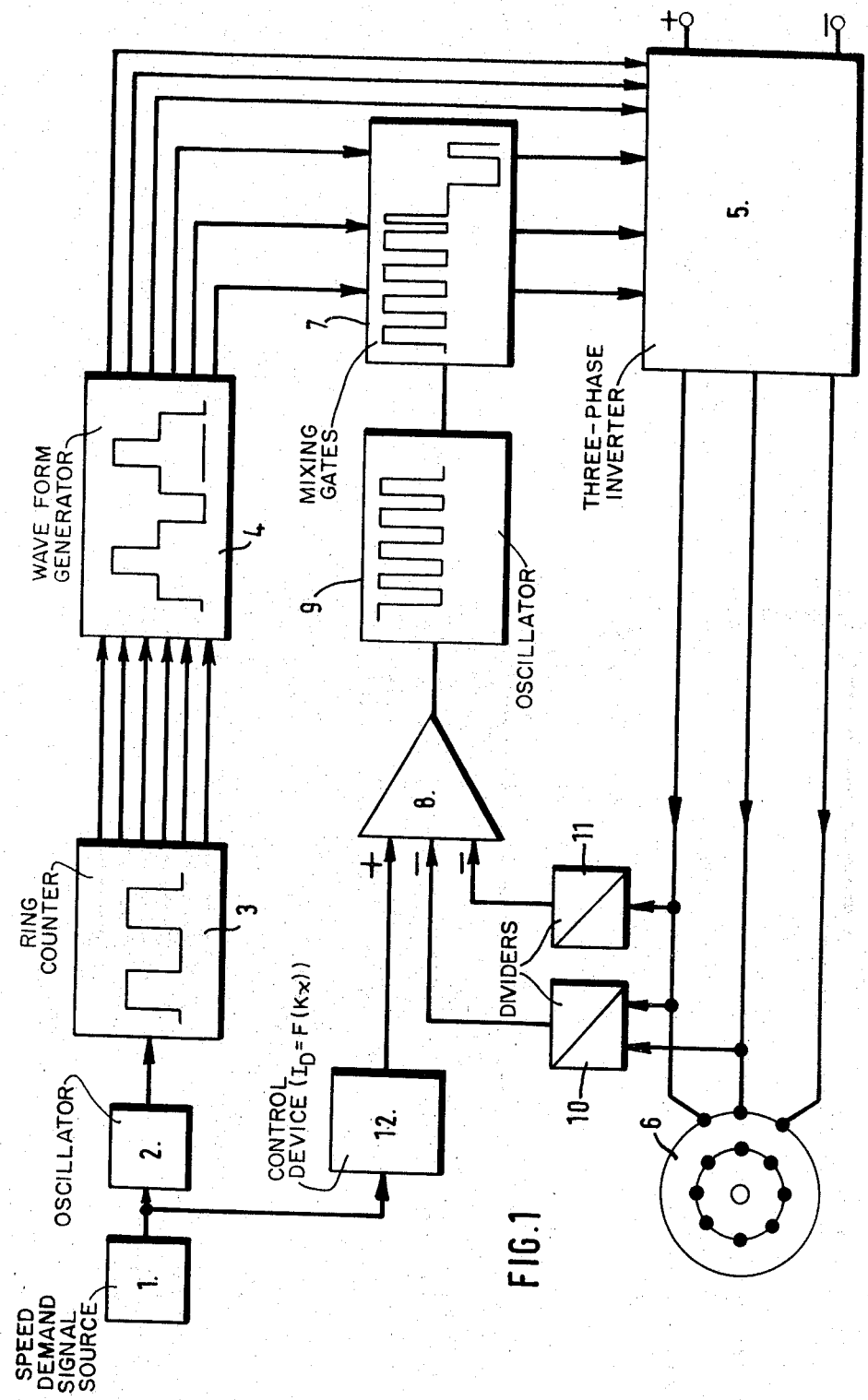

United States Patent [19]
Bowler et al.

[11] 3,775,652
[45] Nov. 27, 1973

[54] SPEED CONTROLS FOR ELECTRIC MOTORS

[75] Inventors: Peter Bowler, Sale; Benjamin Nir, Cheadle, both of England

[73] Assignee: Ernest Scragg & Sons Limited, Macclesfield, England

[22] Filed: Jan. 6, 1972

[21] Appl. No.: 215,715

[52] U.S. Cl. ............ 318/227, 318/230, 318/231
[51] Int. Cl. ............................................. H02p 5/40
[58] Field of Search .................. 318/227, 230, 231

[56] References Cited
UNITED STATES PATENTS

| | | | |
|---|---|---|---|
| 3,512,067 | 5/1970 | Landau | 318/227 |
| 3,611,089 | 10/1971 | Mokrytzki | 318/227 |
| 3,372,323 | 3/1968 | Guyeska | 318/227 |
| 3,593,083 | 7/1971 | Blaschke | 318/227 |
| 3,619,749 | 11/1971 | Schieman | 318/227 |

Primary Examiner—Gene Z. Rubinson
Attorney—Larson, Taylor & Hinds

[57] ABSTRACT

The torque of an induction motor is regulated by feedback of parameters of power supplied to the motor in an open-loop control system. The parameters may be frequency with voltage and current or frequency with impedance. With feedback of voltage and current the control system is arranged so that the voltage feedback predominates in regulating motor torque at high motor speeds and the current feedback predominates at low motor speeds enabling the ratio of no-load to rated-load motor speed to be controlled to be substantially constant for all motor speeds.

3 Claims, 8 Drawing Figures

FIG.1

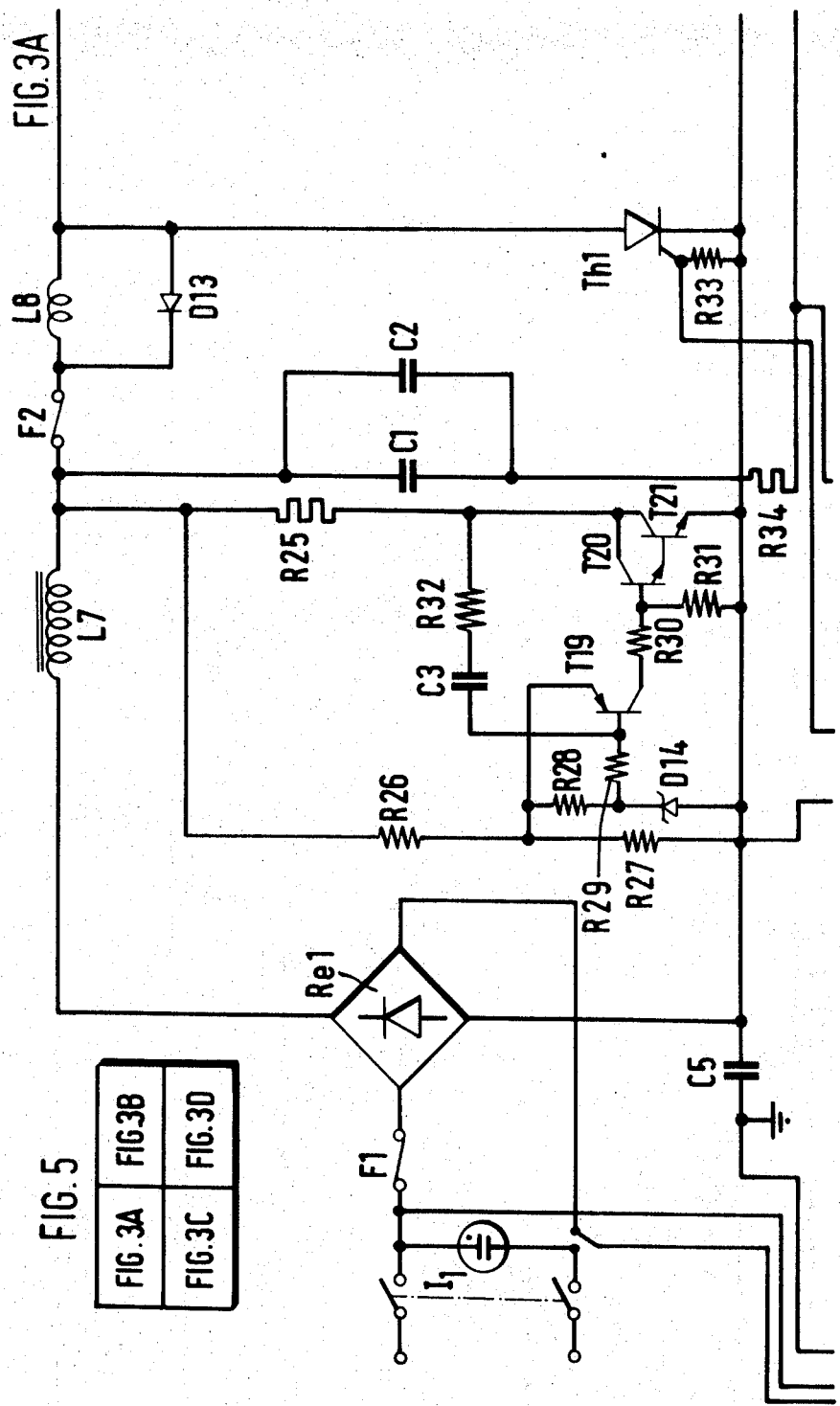

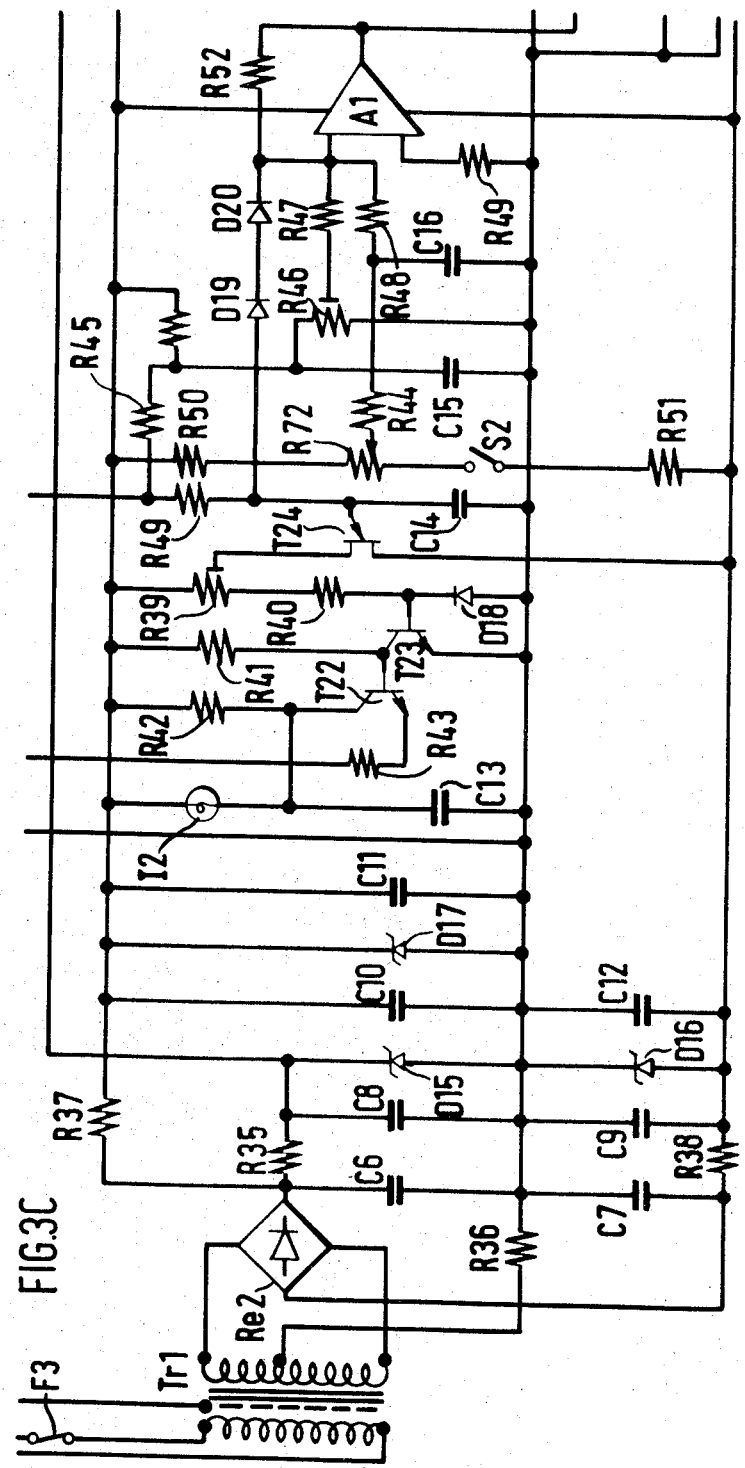

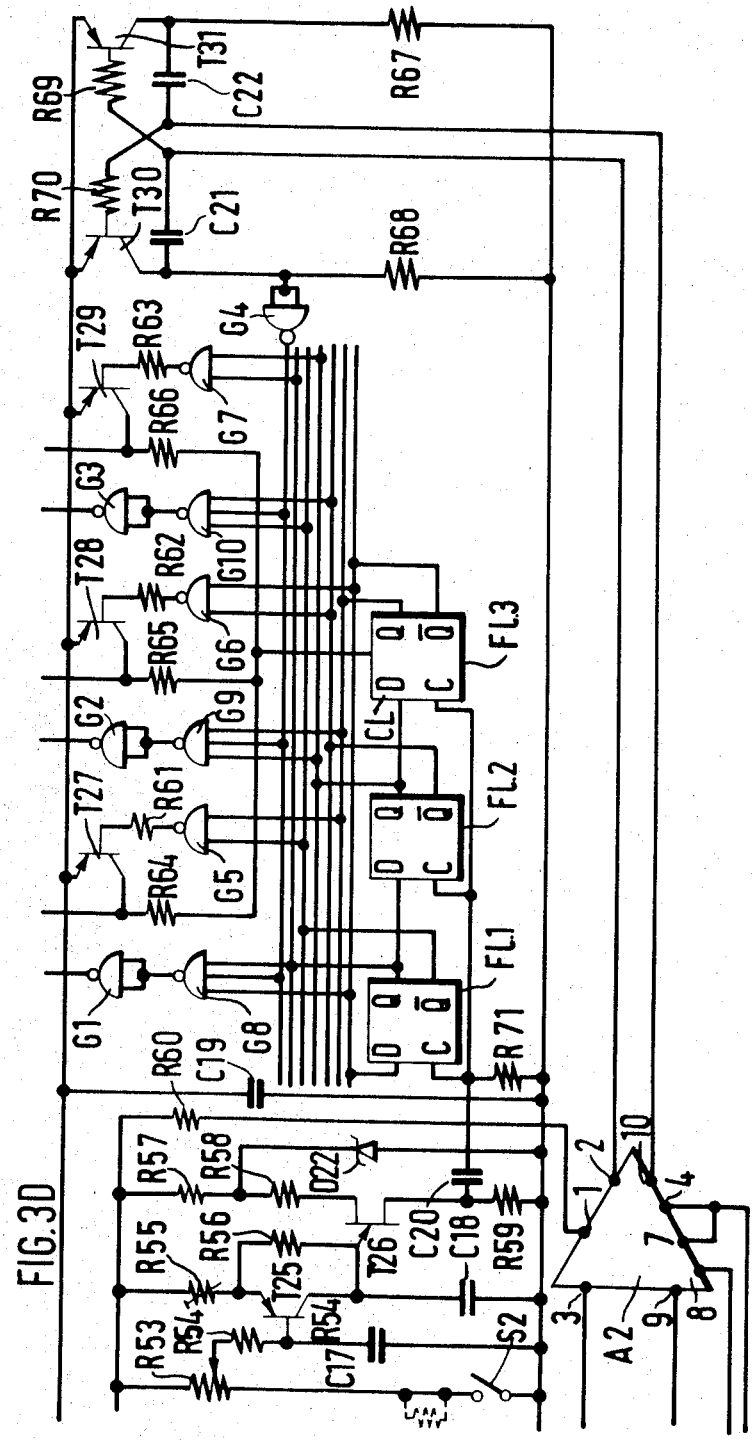

SPEED CONTROLS FOR ELECTRIC MOTORS

DESCRIPTION

This invention relates to speed control systems for induction motors. It is particularly, but not exclusively, applied to the control of squirrel-cage motors to maintain constant any selected speed within a wide range under a variable motor load.

It is known that to obtain good control of induction motors, feedback of the controlled variables, speed or slip, must be employed. It is also known to control slip in an open-loop system by feedback of motor supply voltage, using the motor's torque/slip characteristic as a model to maintain a constant slip frequency. Direct feedback of speed or slip in a closed-loop system gives good torque regulation over wide speed ranges but tachometers which are necessary for speed measurement in such direct feedback systems are expensive and a system employing one may not be economic for low power motors. Indirect feedback of speed or slip using motor supply voltage in an open-loop system eliminates the expense of a tachometer and provides a simple, economic control system that is suitable for all sizes of motor, and it may also be used to provide simultaneous control of a number of motors. However the torque regulation of such a voltage feedback, open-loop control system at low motor speeds is bad because as motor speed decreases the constant slip frequency becomes an increasing proportion of the motor speed.

The present invention seeks to extend the speed range over which good torque regulation is obtainable with an open-loop system by maintaining the slip as a constant fraction of motor speed. At high, near maximum, motor speeds, with variable-voltage and variable-frequency stator excitation set to give a constant no-load motor flux, the slip frequency is small and, as the variable frequency decreases, the slip frequency almost remains a constant value for a rated torque load. Consequently the fractional slip, that is the ratio of slip frequency to rotor frequency, increases as the variable frequency decreases, leading to a proportional increase in the difference between no-load and rated-load speeds.

We have found that the torque regulation can be improved by reducing the difference between no-load and rated-load speeds at all motor speeds below maximum.

Accordingly the present invention comprises a control system for a power supply for induction motors, in which signals proportional to parameters of power supplied to an induction motor are employed by the system to control the ratio of no-load speed to rated-load speed to be substantially constant over substantially the entire speed range of the motor. The parameters may be frequency with voltage and current, or frequency with impedance.

According to one embodiment of the invention, voltage and current feedback signals are employed by the system in such a manner that the voltage feedback predominates in regulating motor torque at high motor speeds and the current feedback predominates in regulating torque at low motor speeds.

In this embodiment, the power supply is an inverter whose frequency is varied by the control system in response to a signal proportional to desired motor speed and whose output voltage is varied, to regulate torque, by the control system in response to feedback loops of, respectively, supply voltage and current. The circuit for the control system is arranged so that voltage feedback loop gain increases with frequency; this means that the torque regulation moves from being essentially current controlled at low frequencies towards being voltage controlled at higher frequencies.

Figure 2:
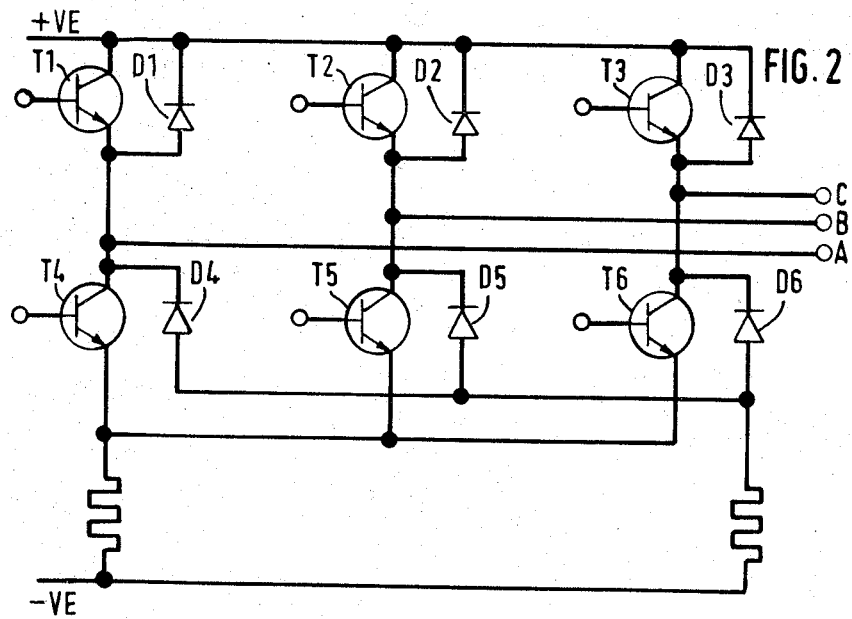
Figure 4:
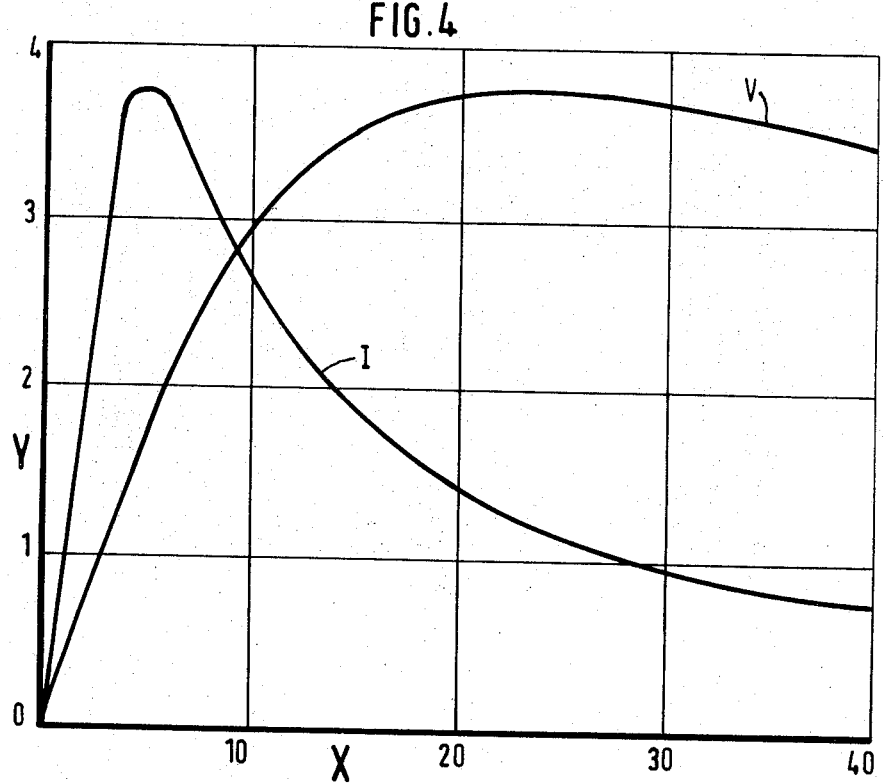
Figure 3B:
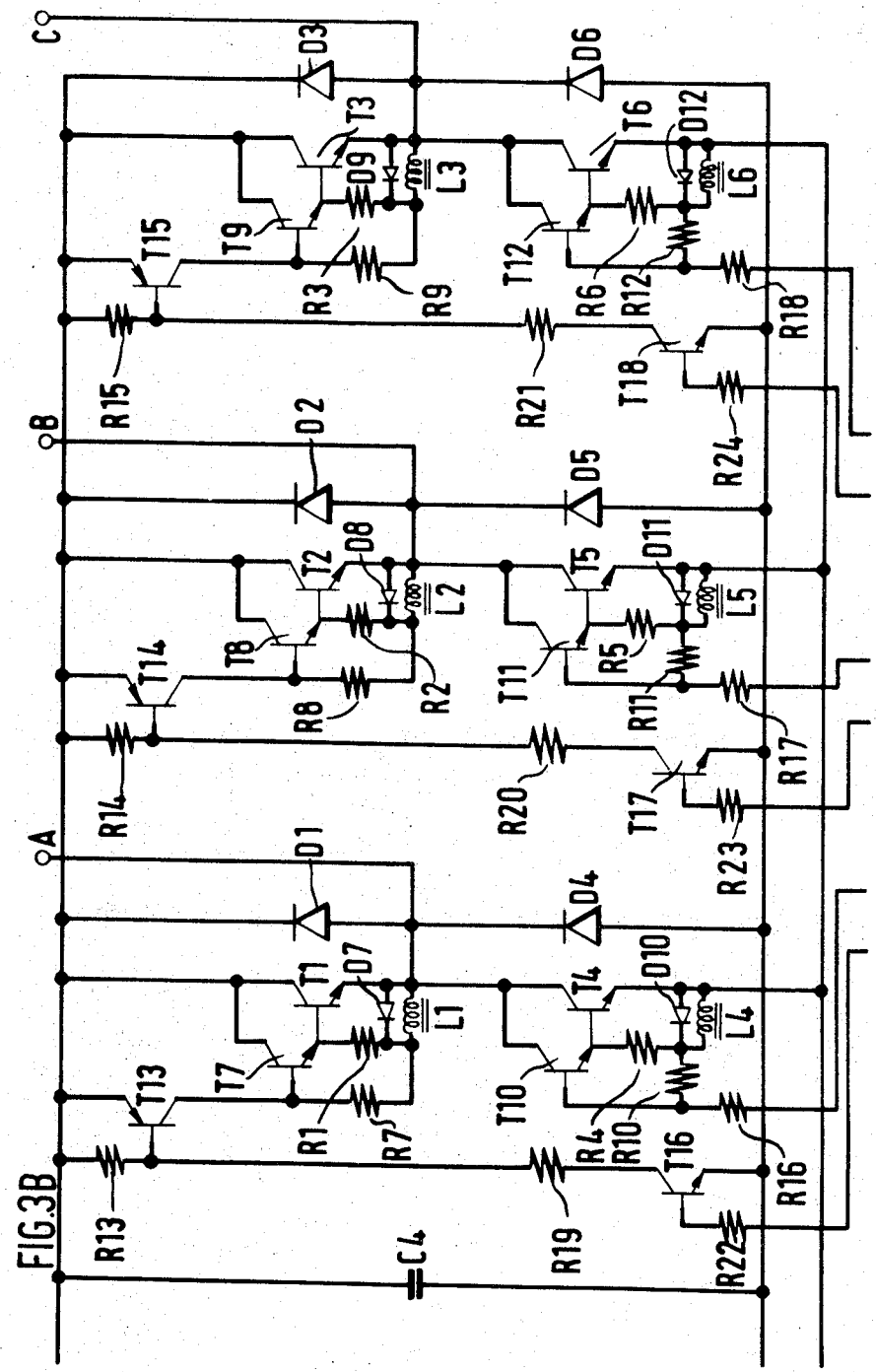

The above and other novel features of the invention are included in the following description with reference, by way of example, to the accompanying drawings, in which:

FIG. 1 is a schematic diagram of a speed control circuit according to the invention, FIG. 2 is a simplified circuit diagram of a transistorised inverter, FIGS. 3A to 3D combine to form a circuit diagram of a complete control system, the inverter and their power supplies, FIG. 4 is a graph showing torque/slip curves for constant voltage and constant current supplies to an induction motor, and FIG. 5 is a diagram showing the arrangement of FIGS. 3A to 3D.

As shown in FIG. 1, the input to the control system is a speed demand signal 1, which is a voltage derived from a potentiometer or external D.C. voltage source, and the signal 1 controls the frequency of an oscillator 2 which drives a three-stage ring counter 3. The ring counter 3 has six outputs each of which can be either "on" or "off" for 180° pulses, the pulses of each output being staggered by 60° from the preceding output. The six outputs pass into a waveform generator 4 which gates pairs of outputs together to synthesize six, 120° on and 60° off, pulse train waveforms at its outputs, each waveform still being staggered by 60° from the preceding one. The waveforms are used to drive a three-phase inverter 5 which powers a squirrel-cage motor 6.

Control of motor voltage from the inverter 5 is achieved by modulating the 120° on pulses of three of the waveforms. Three mixing gates 7 are employed to modulate the waveforms. The modulating input to the gates 7 is derived from a control amplifier 8 in series with a pulse width modulated, high frequency oscillator 9, the amplifier 8 controlling the mark space ratio of the oscillator 9.

The amplifier 8 has three inputs of which two are, respectively, motor voltage and motor current, each being passed through a divider, 10 and 11 respectively, to render them into low voltage signals that are suitable for the control circuit, and thus open-loop voltage and current feedback is achieved. The setpoint of the combined loops is adjusted by the third input to the amplifier 8, which input is a signal derived from the speed demand signal 1 and modified in a device 12 according to the law $I_D = f(K x)$, where $I_D$ is the demand current, $x$ is the frequency (motor speed), and K is a constant. This ensures that the gain of the current feedback loop decreases with increasing frequency.

The inverter 5 (FIG. 2) comprises six power transistors $T_1$ to $T_6$ arranged in a bridge circuit. The transistors are switched by the inverter drive waveforms, the modulated waveforms being applied to the bases of transistors $T_1$, $T_2$ and $T_3$. Due to the 60° stagger between the waveforms a three-phase alternating power supply is produced across the three outputs A, B and C of the inverter; when transistor $T_1$ is turned on, transistor $T_5$ is already on but is turned off half-way through the 120° on period of transistor $T_1$ when transistor $T_6$ comes on. Similarly, transistors $T_6$ and $T_4$ turn off and on respectively during the period of transistor $T_2$ and transistors $T_4$ and $T_5$ for transistor $T_3$. Diodes $D_1$ to $D_6$ are provided, in parallel with transistors $T_1$ to $T_6$ respectively, to pass the back e.m.f's developed across each transistor during its off periods.

As shown in FIG. 3 the demand voltage signal 1 is produced by potentiometer $R_{53}$, and transistors $T_{25}$ and $T_{26}$ form the voltage-controlled oscillator 2 whose output drives the ring counter 3, consisting of flip-flops $FL_1$, $FL_2$ and $FL_3$. Gates $G_5$, $G_6$ and $G_7$ form the waveform generator 4, three of whose outputs are modulated by mixing gates $G_8$, $G_9$ and $G_{10}$. Differential amplifier $A_2$ acts as the control amplifier 8 and transistors $T_{30}$ and $T_{31}$ form a multivibrator, i.e. the pulse-width modulated high frequency oscillator 9.

Resistor $R_1$, diode $D_7$ and inductance $L_1$ are connected to form a circuit to transiently reverse-bias the base-emitter junction of transistor $T_1$, the reverse-biasing ensures that the transistor is quickly and safely turned off. The action of the circuit is due to a bleed current which passes through resistor $R_1$ and inductance $L_1$ while transistor $T_1$ is being driven, this current tends to continue to flow through inductance $L_1$ after the drive transistor $T_7$ is cut off, drawing base current in reverse from transistor $T_1$. The reverse base current removes carriers from the transistor's base-emitter junction and therefore improves the turn-off process of the transistor.

Similar circuits, formed by resistors $R_2$, $R_3$, $R_4$, $R_5$ and $R_6$, diodes $D_8$, $D_9$, $D_{10}$, $D_{11}$ and $D_{12}$ and inductors $L_2$, $L_3$, $L_4$, $L_5$ and $L_6$, transiently reverse-bias transistors $T_2$, $T_3$, $T_4$, $T_5$ and $T_6$ respectively.

Thyristor $Th_1$ is a protection device to blow fuze $F_2$ under fault conditions and thus protect the power inverter 5. The circuit around transistors $T_{20}$ and $T_{21}$ is an absorber for any regenerative power fed back through the inverter 5 into the D.C. power supply.

FIG. 4 is a graph, with motor torque plotted on the Y-axis against percentage slip plotted on the X-axis, for constant motor voltage V and for constant motor current C and shows the lower percentage slip that is obtained by current feedback at low motor speeds.

We claim:

1. An electronic control system for an induction motor, comprising:
   a speed setting circuit comprising
   i. means for varying the magnitude of a direct current signal in proportion to a desired motor speed;
   ii. a first oscillator connected to receive said direct current signal, the frequency of said first oscillator being determined by the magnitude of said motor speed signal;
   iii. pulse generating means, connected to be driven by said first oscillator, for generating a series of pulse train waveforms; and
   iv. an inverter, connected to the pulse generating means to receive said pulse train waveforms, for producing an output multi-phase induction motor power supply through selective switching of said inverter responsive to said pulse train waveforms; said control system further comprising a motor voltage control circuit, comprising
   v. an amplifier;
   vi. loop means connected between said output of said inverter and a first input to said amplifier for feeding back negative direct current signals respectively a function of motor supply voltage and of motor supply current;
   vii. a second, pulse width modulated oscillator connected to an output of said amplifier, the magnitude of the amplifier output signal controlling the mark to space ratio of said second oscillator;
   viii. gate means connected between said pulse generating means and said inverter and to an output of said second oscillator, the mark to space ratio of the output pulses from said second oscillator modulating said pulse train waveforms; and
   ix. means, having an input connected to receive said direct current signal and an output connected to a second input of said amplifier, for producing an output signal which causes the setpoint of said amplifier to vary so as to increase the gain of said negative feedback loop means with an increase in said frequency and to decrease the gain of said current negative feedback loop with a said increase in said frequency.

2. A system as claimed in claim 1, wherein said pulse generating means comprises a three-stage ring counter generating six pulse train waveforms each having a pulse width of 180° and a pulse spacing of 180°, the pulses of each of said waveforms being phase-displaced by 60° with respect to those of the preceding waveform, and a waveform generator connected in series with said pulse generating means which gates together pairs of said pulse train waveforms to produce a further six pulse train waveforms having a pulse width of 120° and a pulse spacing of 60°.

3. A system as claimed in claim 2, wherein said gate means is connected between said waveform generator and said inverter and modulates three of said further six pulse train waveforms.

* * * * *

UNITED STATES PATENT OFFICE
CERTIFICATE OF CORRECTION

Patent No. 3,775,652          Dated November 27, 1973

Inventor(s) Peter Bowler and Benjamin Nir

It is certified that error appears in the above-identified patent and that said Letters Patent are hereby corrected as shown below:

On cover sheet, add reference to Foreign priority as follows:

--[30]. Claims priority of Great Britain Application Serial No. 3251/71 filed January 27, 1971.--

Signed and sealed this 24th day of December 1974.

(SEAL)
Attest:

McCOY M. GIBSON JR.          C. MARSHALL DANN
Attesting Officer            Commissioner of Patents